(12) United States Patent
Lee et al.

(10) Patent No.: US 8,332,934 B2
(45) Date of Patent: *Dec. 11, 2012

(54) UNIT USING OPERATING SYSTEM AND IMAGE FORMING APPARATUS USING THE SAME

(75) Inventors: Jae-sung Lee, Hwaseong-si (KR); Yoon-tae Lee, Seoul (KR); Won-il Cho, Seongnam-si (KR)

(73) Assignee: Samsung Electronics Co. Ltd., Suwon-si (KR)

( * ) Notice: Subject to any disclaimer, the term of this patent is extended or adjusted under 35 U.S.C. 154(b) by 1011 days.

This patent is subject to a terminal disclaimer.

(21) Appl. No.: 12/348,976

(22) Filed: Jan. 6, 2009

(65) Prior Publication Data

US 2009/0220077 A1     Sep. 3, 2009

(30) Foreign Application Priority Data

Mar. 3, 2008    (KR) .................. 10-2008-0019844
Jun. 30, 2008   (KR) .................. 10-2008-0063065

(51) Int. Cl.
    *G06F 21/00*    (2006.01)
(52) U.S. Cl. ............... 726/20; 726/26; 726/34; 713/151
(58) Field of Classification Search ............. 380/55; 726/20, 26, 34; 713/151
    See application file for complete search history.

(56) References Cited

U.S. PATENT DOCUMENTS

| | | | |
|---|---|---|---|
| 5,537,517 A * | 7/1996 | Wakabayashi et al. ...... | 358/1.16 |
| 5,765,197 A * | 6/1998 | Combs .......................... | 711/164 |
| 6,332,024 B1 * | 12/2001 | Inoue et al. ............... | 379/433.06 |
| 6,332,062 B1 | 12/2001 | Phillips et al. | |
| 6,490,420 B2 * | 12/2002 | Pollocks, Jr. ................... | 399/12 |
| 6,532,351 B2 * | 3/2003 | Richards et al. ............... | 399/111 |
| 6,532,551 B1 * | 3/2003 | Kamei et al. ..................... | 714/13 |
| 6,865,349 B2 * | 3/2005 | Silence et al. ................... | 399/8 |
| 6,895,191 B2 * | 5/2005 | Rommelmann et al. ........ | 399/12 |
| 7,007,192 B2 * | 2/2006 | Yamazaki ..................... | 714/5.11 |
| 7,033,011 B2 * | 4/2006 | Murakami et al. ............. | 347/86 |
| 7,146,112 B2 * | 12/2006 | Phipps et al. ................... | 399/12 |
| 7,197,633 B2 * | 3/2007 | Rommelmann et al. .......... | 713/1 |
| 7,206,092 B2 * | 4/2007 | Honma ........................ | 358/1.15 |

(Continued)

FOREIGN PATENT DOCUMENTS

EP    0871088    10/1998

(Continued)

OTHER PUBLICATIONS

International Search Report issued May 28, 2009 in PCT/KR2009/000892.

(Continued)

*Primary Examiner* — David García Cervetti
(74) *Attorney, Agent, or Firm* — Stanzione & Kim, LLP

(57) ABSTRACT

A chip mountable on a customer replaceable unit monitoring memory (CRUM) unit used in an image forming job includes a central processing unit (CPU) with an operating system (OS) thereof, which is separate from an OS of the image forming apparatus, to perform at least one of authentication and cryptographic data communication with a main body of an image forming apparatus by executing one cryptographic algorithm corresponding to a set state from among a plurality of pre-provided cryptographic algorithms, using the OS thereof. The security of a unit on which the chip is mounted can thereby be reinforced and random changes of data of the unit can be prevented.

49 Claims, 6 Drawing Sheets

U.S. PATENT DOCUMENTS

| | | | |
|---|---|---|---|
| 7,231,153 B2 | 6/2007 | May | |
| 7,246,098 B1* | 7/2007 | Walmsley | 705/64 |
| 7,286,772 B2* | 10/2007 | Hwang | 399/8 |
| 7,286,774 B1* | 10/2007 | Miller et al. | 399/12 |
| 7,343,298 B2* | 3/2008 | Asauchi et al. | 705/60 |
| 7,383,444 B2* | 6/2008 | Toyama et al. | 713/192 |
| 7,401,222 B2* | 7/2008 | Rodriguez et al. | 713/168 |
| 7,840,998 B2* | 11/2010 | Rommelmann et al. | 726/17 |
| 2002/0010875 A1* | 1/2002 | Johnson et al. | 714/5 |
| 2002/0030712 A1* | 3/2002 | Silverbrook | 347/19 |
| 2002/0076224 A1* | 6/2002 | Pollocks, Jr. | 399/12 |
| 2002/0094207 A1* | 7/2002 | Richards et al. | 399/8 |
| 2003/0016504 A1* | 1/2003 | Raynham | 361/727 |
| 2003/0123887 A1* | 7/2003 | Imes et al. | 399/24 |
| 2003/0163744 A1* | 8/2003 | Yamazaki | 713/300 |
| 2003/0215245 A1* | 11/2003 | Silence et al. | 399/8 |
| 2003/0215246 A1* | 11/2003 | Tabb et al. | 399/27 |
| 2003/0215247 A1* | 11/2003 | Silence et al. | 399/27 |
| 2003/0215248 A1* | 11/2003 | Silence et al. | 399/38 |
| 2004/0004651 A1* | 1/2004 | Silverbrook | 347/86 |
| 2004/0212820 A1* | 10/2004 | Ogura | 358/1.14 |
| 2004/0255149 A1* | 12/2004 | Toyama et al. | 713/200 |
| 2005/0076088 A1* | 4/2005 | Kee et al. | 709/206 |
| 2005/0105721 A1* | 5/2005 | Ono | 380/51 |
| 2005/0146583 A1* | 7/2005 | Silverbrook | 347/87 |
| 2005/0162455 A1* | 7/2005 | Silverbrook | 347/19 |
| 2005/0163514 A1* | 7/2005 | Hwang | 399/8 |
| 2005/0172118 A1* | 8/2005 | Nasu | 713/156 |
| 2006/0119884 A1* | 6/2006 | Choi | 358/1.15 |
| 2006/0133831 A1 | 6/2006 | Rommelmann et al. | |
| 2006/0136989 A1 | 6/2006 | Rodriguez et al. | |
| 2006/0146355 A1* | 7/2006 | Kim | 358/1.13 |
| 2006/0153579 A1* | 7/2006 | Phipps et al. | 399/24 |
| 2006/0168580 A1* | 7/2006 | Harada et al. | 717/174 |
| 2006/0265742 A1* | 11/2006 | Rommelmann et al. | 726/16 |
| 2007/0047974 A1* | 3/2007 | Tanaka | 399/8 |
| 2007/0058991 A1 | 3/2007 | Rommelmann et al. | |
| 2007/0085879 A1 | 4/2007 | May | |
| 2007/0160204 A1* | 7/2007 | Kimura et al. | 380/46 |
| 2007/0211285 A1* | 9/2007 | Shipton | 358/1.15 |
| 2008/0087736 A1* | 4/2008 | Silverbrook | 235/494 |
| 2008/0252701 A1* | 10/2008 | Matsumoto et al. | 347/86 |
| 2011/0216138 A1* | 9/2011 | Rodriguez et al. | 347/88 |

FOREIGN PATENT DOCUMENTS

| | | |
|---|---|---|
| EP | 1217456 | 6/2002 |
| RU | 2268150 | 1/2006 |

OTHER PUBLICATIONS

Russian Office Action issued Nov. 15, 2011 in RU Application No. 2010136825.

Korean Office Action issued on Sep. 28, 2010 in KR Application No. 10-2008-0063063.

Korean Office Action issued on Sep. 28, 2010 in KR Application No. 10-2008-0063065.

Korean Office Action issued on Sep. 28, 2010 in KR Application No. 10-2008-0063068.

Russian Notice of Allowance Issued on Feb. 20, 2012 in RU Patent Application No. 2010136825.

* cited by examiner

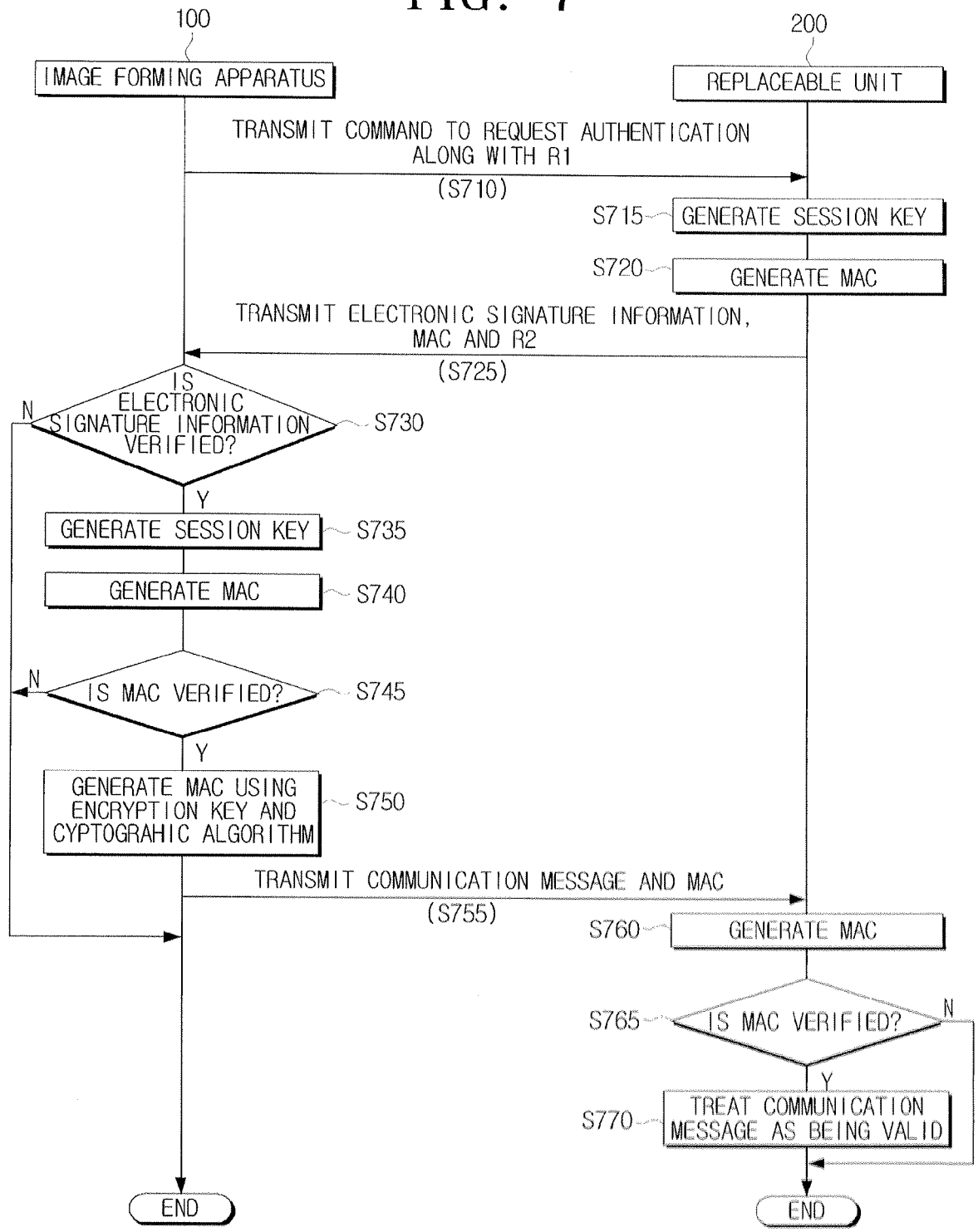

UNIT USING OPERATING SYSTEM AND IMAGE FORMING APPARATUS USING THE SAME

CROSS-REFERENCE TO RELATED APPLICATIONS

This application claims priority under 35 U.S.C. §119 (a) from Korean Patent Application Nos. 10-2008-0019844 and 10-2008-0063065, filed on Mar. 3, 2008 and Jun. 30, 2008, in the Korean Intellectual Property Office, the disclosures of which are incorporated herein by reference in their entirety.

BACKGROUND OF THE INVENTION

1. Field of the Invention

The present general inventive concept relates to a unit including a built-in central processing unit (CPU) and an image forming apparatus using the same. More particularly, the present general inventive concept relates to a unit which becomes more secure by having a CPU with its own operating system (OS), and an image forming apparatus using the same.

2. Description of the Related Art

As computers have become widely used, peripherals have also become widespread. Examples of peripherals are image forming apparatuses such as printers, scanners, copiers, and multifunction devices.

Image forming apparatuses use ink or toner to print images onto paper. Ink and toner are used whenever image forming operations are performed, until the ink or toner is finally exhausted. If the ink or toner is empty, a user must replace a unit for storing the ink or toner. Such components which are replaceable while using the image forming apparatuses are referred to as consumables or replaceable units.

Among replaceable units, some units other than units which have to be replaced when the ink or toner is exhausted must be replaced after being used for a predetermined period of time even if the ink or toner are not exhausted since property changes after the predetermined period of time and a printing quality is reduced.

For example, a laser image forming apparatus includes a charge unit, a transfer unit, a fusing unit, and so on, and diverse types of rollers and belts used in each unit may be worn out or damaged due to use over a limited life span. As a result, the printing quality may be remarkably deteriorated. Therefore, the user has to replace such replaceable units at appropriate times.

The time to replace replaceable units can be determined using a use state index. The use state index represents an index to indicate a degree of use of the image forming apparatus, for example, a number of pieces of paper printed by the image forming apparatus and a number of dots forming an image. The image forming apparatus can determine the time to replace replaceable units by measuring the number of pieces of paper printed by the image forming apparatus or the number of dots.

Recently, in order for the user to precisely determine the time to replace each replaceable unit, each replaceable unit includes a built-in customer replaceable unit monitoring memory (CRUM memory). The use state index of each replaceable unit is stored in the CRUM memory. Accordingly, even if each replaceable unit is separated and used in different image forming apparatuses, the use state of each replaceable unit can be determined precisely.

However, a conventional replaceable unit having a CRUM memory has a problem that users can easily access the CRUM memory. Information stored in the CRUM memory is very diverse from basic information regarding the manufacturer to information regarding a recent use state, so if the information is modified, receiving after-sale service and calculating an adequate time to replace the replaceable unit is difficult, resulting in degradation of image forming operations. In particular, if information regarding the manufacturer is modified, determining whether the replaceable unit is authentic is impossible. Accordingly, difficulty exists in managing the replaceable unit.

SUMMARY OF THE INVENTION

The present general inventive concept provides a unit which becomes more secure by having a built-in CPU with its own operating system (OS), and an image forming apparatus using the same.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a chip which is mountable on a replaceable unit used in an image forming job, the chip including a central processing unit (CPU) with an operating system (OS) thereof, which is separate from an OS of the image forming apparatus, to perform at least one of authentication and cryptographic data communication with a main body of the image forming apparatus by executing one cryptographic algorithm corresponding to a set state from among a plurality of pre-provided cryptographic algorithms, using the OS thereof.

The CPU may perform initialization using the OS thereof, separately from the main body of the image forming apparatus.

The CPU may perform the authentication according to the executed cryptographic algorithm, and perform the cryptographic data communication when the authentication is completed.

The CPU may perform the cryptographic data communication using a message authentication code (MAC) which is changed whenever each data is transmitted and received.

The CPU may generate a message authentication code (MAC) when an authentication request is received from the main body of the image forming apparatus, and transmit the generated MAC and unique digital signature information to the main body of the image forming apparatus.

When the image forming apparatus is powered on or a unit with the built-in chip is mounted on the image forming apparatus, the CPU may perform the initialization according to the OS thereof, and may not respond to a command from the main body of the image forming apparatus before the initialization is completed.

The chip may further include a memory unit to store information on at least one of the chip, a customer replaceable unit monitoring memory (CRUM) unit with the chip, and a replaceable unit with the built-in CRUM unit, and an OS of the memory unit.

The OS thereof may drive at least one of the chip, the CRUM unit, and the replaceable unit, and be software that executes at least one of an initialization operation to independently initialize one state of the chip, the CRUM unit, and the replaceable unit, a processing operation to execute a public cryptographic algorithm, and a mutual authentication operation with the main body of the image forming apparatus.

The chip may further include a temper detector to respond to physical hacking attempts, and a crypto unit to allow the CPU to perform the authentication or the cryptographic data communication with the image forming apparatus by applying a respective pre-provided cryptographic algorithm.

The cryptographic algorithm applied to one of the authentication and the cryptographic data communication may be changeable.

The CPU may receive values of use degree of consumables used for the image forming job from the main body of the image forming apparatus, when the image forming job is executed using the replaceable unit, add the values to the information on the use degree of consumables stored in the memory unit, and then refresh the information on the use degree of consumables.

The foregoing and/or other aspects and utilities of the present general inventive concept may also be achieved by providing a customer replaceable unit monitoring memory (CRUM) unit which can be used in an image forming job, the CRUM unit including a memory unit to store information on a unit on which the CRUM unit is mounted, and a CPU to manage the memory unit using an operating system (OS) thereof which is separate from an OS of an image forming apparatus, and to perform at least one of authentication and cryptographic data communication with the main body of the image forming apparatus by executing one cryptographic algorithm corresponding to a set state among a plurality of pre-provided cryptographic algorithms.

The CPU may perform initialization using the OS thereof, separately from the main body of the image forming apparatus.

The OS thereof may drive the CRUM unit or a replaceable unit with the CRUM unit, and be software that executes at least one of an initialization operation to independently initialize the state of the CRUM unit or the replaceable unit, a processing operation to execute a public cryptographic algorithm, and a mutual authentication operation with the main body of the image forming apparatus.

The CPU may perform the authentication communication with the main body of the image forming apparatus during the initialization process performed separately from the main body of the image forming apparatus, and perform cryptographic data communication when the authentication is completed.

The CPU may perform the cryptographic data communication such that when communication messages including data and message authentication code (MAC) information are transmitted from the main body of the image forming apparatus, a MAC is generated by applying a key and an encryption algorithm to a data portion of the transmitted communication messages, and when the generated MAC is compared and made consistent with the MAC information of the transmitted communication messages, the generated MAC is treated as a valid communication message and processed.

When an authentication request is received from the main body of the image forming apparatus, the CPU may generate a MAC and transmit the generated MAC and unique digital signature information to the main body of the image forming apparatus.

When the image forming apparatus is powered on or a unit with the built-in CRUM unit is mounted on the image forming apparatus, the CPU may perform the initialization, and does not respond to a command from the main body of the image forming apparatus before the initialization is completed.

The CRUM unit may further include an interface unit to connect the image forming apparatus to the CPU, a temper detector to respond to physical hacking attempts, and a crypto unit to allow the CPU to perform the authentication or the cryptographic data communication with the image forming apparatus by applying a respective pre-provided cryptographic algorithm among a plurality of cryptographic algorithms.

The cryptographic algorithm applied to any one of the authentication and the cryptographic data communication may be changeable into another algorithm among the plurality of algorithms.

The CPU may receives values of a degree of use of consumables used for the image forming job when the image forming job is executed, from the main body of the image forming apparatus, add the values to the information on the use degree of consumables stored in the memory unit, and then refresh the information on the use degree of consumables.

The foregoing and/or other aspects and utilities of the present general inventive concept may also be achieved by providing a replaceable unit which is mountable on an image forming apparatus to be used in an image forming job, the replaceable unit including a memory unit to store information on the replaceable unit, and a CPU to manage the memory unit using an operating system (OS) thereof, which is separate from an OS of the image forming apparatus, and to perform at least one of authentication and cryptographic data communication with the main body of an image forming apparatus by executing one cryptographic algorithm corresponding to a set state among a plurality of pre-provided cryptographic algorithms.

The CPU may perform initialization using the OS thereof, separately from the main body of the image forming apparatus.

The OS thereof may drive the CRUM unit or the replaceable unit and be software that executes at least one of an initialization operation to independently initialize the state of the CRUM unit or the replaceable unit, a processing operation to execute a public cryptographic algorithm, and a mutual authentication operation between the main body of the image forming apparatus and the replaceable unit.

The CPU may perform the authentication between the main body of the image forming apparatus during the initialization process performed separately from the main body of the image forming apparatus, and perform cryptographic data communication when the authentication is completed.

The CPU may perform the cryptographic data communication such that when communication messages including data and message authentication code (MAC) information are transmitted from the main body of the image forming apparatus, a MAC is generated by applying a key and an encryption algorithm to a data portion of the transmitted communication messages, and when the generated MAC is compared and made consistent with the MAC information of the transmitted communication messages, the generated MAC is treated as a valid communication message and processed.

When an authentication request is received from the main body of the image forming apparatus, the CPU may generate a MAC and transmit the generated MAC and unique digital signature information to the main body of the image forming apparatus.

When the image forming apparatus is powered on or the replaceable unit is mounted on the image forming apparatus, the CPU may perform the initialization according to its own OS, and may not respond to a command from the main body of the image forming apparatus before the initialization is completed.

The replaceable unit may further include an interface unit to connect the image forming apparatus to the CPU, a temper detector to respond to physical hacking attempts, and a crypto unit to allow the CPU to perform the authentication or the cryptographic data communication with the image forming apparatus by applying the set cryptographic algorithm among a plurality of cryptographic algorithms.

The cryptographic algorithm applied to one of the authentication and the cryptographic data communication may be changeable into another one among the plurality of cryptographic algorithms.

The CPU may receive values of a degree of use of consumables used for the image forming job when the image forming job is executed, from the main body of the image forming apparatus, add the values to the information on the use degree of consumables stored in the memory unit, and then refresh the information on the use degree of consumables.

The foregoing and/or other aspects and utilities of the present general inventive concept may also be achieved by providing an image forming apparatus, including a main controller, and at least one unit which includes a memory unit to store information and a CPU to manage the memory unit using an operating system (OS) thereof, separately from an OS of the main controller, wherein the CPU performs at least one of authentication and cryptographic data communication with the main body of the image forming apparatus by executing one cryptographic algorithm corresponding to a set state among a plurality of pre-provided cryptographic algorithms, using the OS thereof.

The CPU may perform initialization using the OS thereof, separately from the main controller.

The cryptographic algorithm applied to one of the authentication and the cryptographic data communication may be changeable into another among the plurality of cryptographic algorithms.

When the authentication for the unit has succeeded, the main controller may generate a MAC by applying preset key and encryption algorithm to data, generate communication messages including the generated MAC and the data, and transmit the generated communication messages unit.

The main controller may request authentication to the CPU of the at least one unit, and when digital signature information and the MAC are transmitted from the CPU, the main controller may detect the digital signature information and the MAC to perform the authentication.

The main controller may receive the unique digital signature information set for each unit of the at least one unit to perform the authentication, and perform the cryptographic data communication with the respective CPUs of each unit when the authentication has succeeded.

The main controller may perform the authentication and the cryptographic data communication by applying an RSA asymmetric key algorithm and one of ARIA, triple data encryption standard (TDES), SEED and advanced encryption standard (AES) symmetric key algorithms, and the CPU of the unit may perform the authentication and the cryptographic data communication by applying one of the ARIA, TDES, SEED, AES symmetric key algorithms.

The unit may further include a crypto unit to allow the CPU to perform the authentication or the cryptographic data communication with the main controller of the image forming apparatus by applying the executed cryptographic algorithm, and a temper detector to respond to physical hacking attempts.

The main controller may be connected to the at least one unit through one serial I/O channel, and be accessed to the at least one unit using individual addresses given to each unit.

When the job is executed, the main controller may measure values of a degree of use of consumables used for the job, transmit the measured values to each CPU of the at least one unit, add the values to the information on the use degree of consumables prestored in each CPU, and then refresh the information on the use degree of consumables.

The CPU may perform the cryptographic data communication using a message authentication code (MAC) which is changed whenever each data is transmitted and received.

The OS thereof may be software that executes at least one of an initialization operation, a processing operation to execute a public cryptographic algorithm, and a mutual authentication operation between the main controller and the replaceable unit.

The unit may be one of a replaceable unit directly associated with an image forming job of the image forming apparatus, a CRUM unit mountable on the replaceable unit, and a chip mountable on the CRUM unit.

A CPU with its own operation system (OS) may be mounted in the unit, so the unit can manage the memory unit independently. The unit may be a chip, a CRUM unit, or replaceable unit. The OS is driven so that initialization, cryptographic algorithm driving, and authentication with the main body of the image forming apparatus may be performed.

Even when a master key is not stored in the image forming apparatus having the unit, the image forming apparatus may perform authentication or cryptographic data communication with the unit. Therefore, a master key can be prevented from being leaked. The authentication or cryptographic data communication may be performed using a MAC generated based on a random value, and electronic signature information. The authentication is performed by applying both symmetric and asymmetric key algorithms, so the cryptography provides high level data security.

A plurality of cryptographic algorithms may be selectively applied to the authentication and the cryptographic data communications. Even if the currently used cryptographic algorithm is attacked by physical hacking, the attack may be prevented by replacing the currently used key with a key applying the other cryptographic algorithm without replacing the unit with a new unit.

If a plurality of units are used, electronic signature information is set for each unit. Individual addresses are given to each unit, and thus the unit may be connected to the image forming apparatus through a serial interface. Authentication and cryptographic data communication between the plurality of units is efficiently achieved.

If an image forming job is completed, the image forming apparatus measures the degree of use of consumables required for the image forming job, and transmits the measured values to each of the plurality of units. Therefore, incorrect information regarding the degree of use of consumables is prevented from being recorded due to errors.

As a result, data stored in the memory unit built in the unit of the image forming apparatus is prevented from being copied or duplicated, and security of the data is enhanced. Users are also protected from using an uncertified unit.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIG. 7 is a flowchart illustrating a method to perform authentication and cryptographic data communications between the image forming apparatus and the replaceable unit according to an exemplary embodiment of the present general inventive concept.

DETAILED DESCRIPTION OF THE PREFERRED EMBODIMENTS

Figure 1:
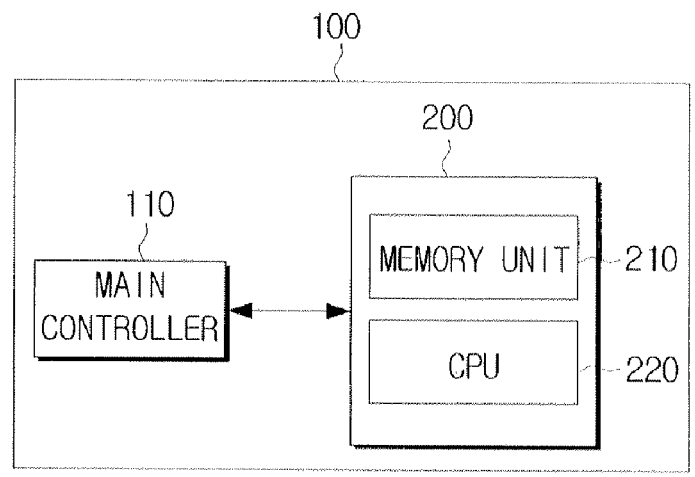
FIG. 1 is a schematic block diagram illustrating a configuration of an image forming apparatus including a replaceable unit according to an exemplary embodiment of the present general inventive concept.

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a schematic block diagram illustrating a configuration of an image forming apparatus including a replaceable unit according to an exemplary embodiment of the present general inventive concept. As illustrated in FIG. 1, the image forming apparatus 100 includes a main controller 110, and a unit 200 may be built into the image forming apparatus 100. The image forming apparatus 100 may be a copier, a printer, a multifunction peripheral, a facsimile machine, or a scanner.

The unit 200 represents a component which is designed to be installed and used independently. More specifically, the unit 200 may be a replaceable unit which is formed in the image forming apparatus and directly intervenes in the image forming operation. For example, the replaceable unit may be a toner or ink cartridge, a charge unit, a transfer unit, a fusing unit, an organic photo conductor (OPC), a feeding unit, or a feeding roller, etc.

Furthermore, the unit 200 may be any other component which is necessary for the image forming apparatus 100, and is replaceable during use. That is, the unit 200 may be a customer replaceable unit monitor (CRUM) which can monitor and manage a state of a component by being included in the replaceable unit, or may be a chip built into the CRUM. The unit 200 can be implemented in diverse forms, but a unit 200 implemented as a replaceable unit is described hereinbelow for convenience of description.

As illustrated in FIG. 1, the unit 200 includes a memory unit 210 and a central processing unit (CPU) 220.

The memory unit 210 stores diverse types of information regarding the unit 200, and, more specifically, stores unique information such as information regarding the manufacturer of the unit 200, information regarding the time of manufacture, a serial number or a model number, diverse programs, information regarding an electronic signature, state information regarding the state of use (for example, how many pieces of paper have been printed up until the present time, what the remaining printable capacity is, or how much toner is left).

For example, the memory unit 210 may store information as in the following Table 1.

| General Information | |
|---|---|
| OS Version | CLP300_V1.30.12.35 Feb. 22, 2007 |
| SPL-C Version | 5.24 Jun. 28, 2006 |
| Engine Version | Jun. 01, 2000(55) |
| USB Serial Number | BH45BAIP914466B. |
| Set Model | DOM |
| Service Start Date | 2007-09-29 |
| Option | |
| RAM Size | 32 Mbytes |
| EEPROM Size | 4096 bytes |
| USB Connected (High) | |
| Consumables Life | |
| Total Page Count | 774/93 Pages(Color/mono) |
| Fuser Life | 1636 Pages |
| Transfer Roller Life | 864 Pages |
| Tray1 Roller Life | 867 Pages |
| Total Image Count | 3251 Images |
| Imaging Unit/Deve Roller Life | 61 Images/19 Pages |
| Transfer Belt Life | 3251 Images |
| Toner Image Count | 14/9/14/19 Images(C/M/Y/K) |
| Toner Information | |
| Toner Remains Percent | 99%/91%/92%/100% (C/M/Y/K) |
| Toner Average Coverage | 5%/53%/31%/3% (C/M/Y/K) |
| Consumables Information | |
| Cyan Toner | SAMSUNG(DOM) |
| Magenta Toner | SAMSUNG(DOM) |
| Yellow Toner | SAMSUNG(DOM) |
| Black Toner | SAMSUNG(DOM) |
| Imaging unit | SAMSUNG(DOM) |
| Color Menu | |
| Custom Color | Manual Adjust(CMYK: 0, 0, 0, 0) |
| Setup Menu | |
| Power Save | 20 Minutes |
| Auto Continue | On |
| Altitude Adj. | Plain |

As illustrated in Table 1 above, the memory unit 210 may store diverse information regarding a life span of consumables, and setup menus, as well as schematic information regarding the unit 200.

The CPU 220 manages the memory unit 210 using its own operating system (OS). The OS, which is provided to operate the unit 200, represents software to operate general application programs. Accordingly, the CPU 220 can perform initialization by itself using the OS.

In greater detail, the CPU 220 performs initialization at the time of particular events, for example, when the image forming apparatus 100 including the unit 200 is turned on, or when the unit 200 or a component including the unit 200, that is, a replaceable unit is attached to or detached from the image forming apparatus 100. Initialization includes initial driving of diverse application programs used in the unit 200, secret calculation information needed for data communications with the image forming apparatus after initialization, setup of a communication channel, initialization of a memory value, confirmation of a replacement time, setting of register values in the unit 200, and setting of internal and external clock signals.

Setting of register values represents setting function register values in the unit 200 in order for the unit 200 to operate in the same state as the user previously set. In addition, setting of internal and external clock signals represents adjusting a frequency of an external clock signal provided from the main controller 110 of the image forming apparatus 100 to a frequency of an internal clock signal to be used in the CPU 220 of the unit 200.

Confirmation of the replacement time represents checking the remaining amount of toner or ink in use, anticipating time when the toner or ink will be exhausted, and notifying the main controller 110 of the time. If a determination is made during initialization that the toner has already been exhausted, after completing initialization the unit 200 may be implemented to automatically notify the main controller 110 that the operation cannot be performed. In other cases, since the unit 200 includes its own OS, diverse forms of initialization can be performed according to the type or characteristic of the unit 200.

Such initialization is performed by the unit 200 itself, and thus is performed separately from initialization performed by the main controller 110 of the image forming apparatus 100.

As described above, the CPU 220 is built in the unit 200 and the unit 200 has its own OS, so if the image forming apparatus 100 is turned on, the main controller 110 can check the remaining amount of consumables and the number of refills, which are stored in the memory unit 210, before requesting communication with the unit 200. Consequently, informing the main controller 110 that consumables should be replaced takes a shorter amount of time. For example, if toner is insufficient, the user can turn on the image forming apparatus 100, and convert the image forming apparatus 100 directly into a toner saving mode. The use can also perform the same operation even when only one particular toner is insufficient.

The CPU 220 does not respond to commands of the main controller 110 until initialization is completed. The main controller 110 periodically transmits commands to the CPU 220 until the main controller 110 receives a response from the CPU 220.

If the main controller 110 receives a response, that is, an acknowledgement, authentication is initiated between the main controller 110 and the CPU 220.

In this case, the OS in the unit 200 enables authentication by interaction between the unit 200 and the image forming apparatus 100. However, in order for a conventional image forming apparatus to perform authentication, the main controller of the image forming apparatus unilaterally accesses the unit, identifies unique information for authentication, and compares the unique information with stored information.

However, the main controller 110 in the present image forming apparatus 100 performs its own initialization separately from initialization of the unit 200. Initialization of the unit 200 is completed first due to differences in the size of the systems. If initialization of the unit 200 is completed, the unit 200 can drive a cryptographic algorithm using the OS. More specifically, the unit 200 drives a cryptographic algorithm in response to a command of the main controller 110 so that interactive authentication between the main controller 110 and the unit 200, no unilateral authentication of the main controller 110, can be performed. Consequently, security of authentication increases.

Such authentication can be performed in diverse forms. For example, the main controller 110 receives a response from the CPU 220 and transmits a command to the CPU 220 requesting authentication. In this case, a random value R1 can be transmitted to the CPU 220 along with the command. The CPU 220 receives the request for authentication and the random value R1, generates a session key using the random value R1, generates a message authentication code (MAC) using the generated session key, and transmits the generated MAC, prestored electronic signature information, and a random value R2 to the main controller 110.

If the main controller 110 identifies the authenticity by verifying the received electronic signature information, the main controller 110 generates a session key using the received random value R2 and the pre-generated random value R1 and generates a MAC using the session key. Finally, the main controller 110 verifies the MAC by identifying whether the generated MAC is the same as the received MAC. As a result, the main controller 110 can determine if authentication has been successfully performed. As described above, since random values are used upon transmitting information or commands for authentication, malicious hacking of a third party can be prevented.

If authentication is successfully performed, cryptographic data communications is performed between the main controller 110 and the CPU of the unit 200. As described above, since the unit 200 has its own OS, a cryptographic algorithm can be executed. Therefore, data validity can be determined by applying the cryptographic algorithm to the data received from the image forming apparatus 100. As a result of determination, if the data are valid, the unit 200 receives the data and performs an operation to process the data. If the data are not valid, the unit 200 may discard the data as soon as receiving the data. In this case, the unit 200 may notify the main controller 110 that there is a problem in data communications.

The cryptographic algorithm may use a public standard cryptographic algorithm. Such a cryptographic algorithm can be modified when an encryption key is opened or when security needs to be reinforced.

In the above exemplary embodiment of the present general inventive concept, since the unit 200 has its own OS, its own initialization, and authentication and cryptographic data communications between the unit 200 and the image forming apparatus 100 can be performed efficiently.

Figure 2:
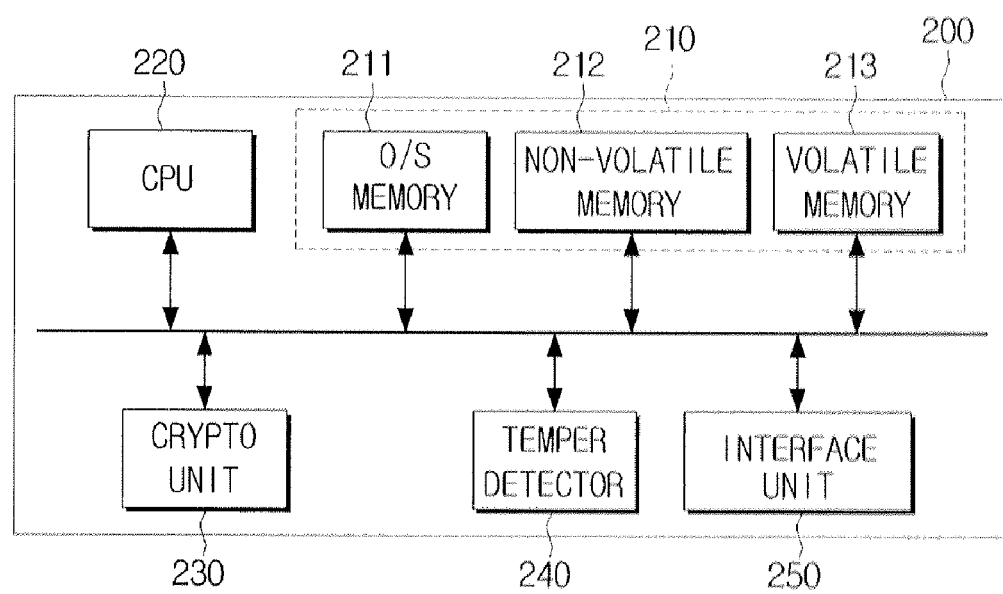
FIG. 2 is a detailed block diagram illustrating a configuration of the replaceable unit according to an exemplary embodiment of the present general inventive concept.

FIG. 2 is a detailed block diagram illustrating the replaceable unit 200 of the image forming apparatus 100 illustrated in FIG. 1. The replaceable unit 200 of FIG. 2 includes a crypto unit 230, a temper detector 240 and an interface unit 250 in addition to the memory unit 210 and CPU 220. Additionally, the replaceable unit 200 may further include a clock unit (not illustrated) to output a clock signal or a random value generator (not illustrated) to generate random values for authentication. Here, some components may be deleted from the replaceable unit 200, or other components may be added to the replaceable unit 200. If the replaceable unit 200 is implemented as a chip, the chip may include only the CPU 220, or may include only the memory unit 210 and CPU 220. If the chip includes only the CPU 220, an OS executed by the CPU 220 may be provided by an external memory.

The crypto unit 230 supports a cryptographic algorithm and causes the CPU 220 to perform authentication or cryptographic data communication with the main controller 110. Specifically, the crypto unit 230 may support one of four cryptographic algorithms, that is, ARIA, triple data encryption standard (TDES), SEED, and advanced encryption standard (AES) symmetric key algorithms.

To perform authentication or cryptographic data communication, the main controller 110 also supports the four cryptographic algorithms. Accordingly, the main controller 110 may determine which cryptographic algorithm is applied by the replaceable unit 200, may perform the authentication using the determined cryptographic algorithm, and may then perform the cryptographic data communication with the CPU 220. As a result, the replaceable unit 200 may be easily mounted in the image forming apparatus 100 so that the cryptographic data communication may be performed, even when a key to which a certain cryptographic algorithm is applied is generated.

The temper detector 240 prevents various physical hacking attacks, namely tempering. In more detail, if a decap attack is detected by monitoring operating conditions such as voltage, temperature, pressure, light or frequency, the temper detector 240 may delete data relating to the decap attack, or may physically prevent the decap attack. In this situation, the temper detector 240 may include an extra power source.

As described above, the replaceable unit 200 includes the crypto unit 230 and temper detector 240, systematically securing data using either or both hardware and software is possible.

Referring to FIG. 2, the memory unit 210 may include at least one of an OS memory 211, a non-volatile memory 212 and a volatile memory 213.

The OS memory 211 stores an OS to operate the replaceable unit 200. The non-volatile memory 212 stores data in non-volatile form, and the volatile memory 213 is used to be a temporary storage space required for operations. While the memory unit 210 includes the OS memory 211, non-volatile memory 212 and volatile memory 213 as illustrated in FIG. 2, some of the memories may be built into the CPU 220 as internal memories. The OS memory 211, non-volatile memory 212 and volatile memory 213 may be implemented according to a design for security such as address/data line scrambling or bit encryption, differently from general memories.

The non-volatile memory 212 may store a variety of information, such as digital signature information, information regarding various cryptographic algorithms, information regarding the state of use of the replaceable unit 200 (for example, information regarding the remaining toner level, the time at which toner needs to be replaced, or the number of remaining sheets to be printed), unique information (for example, information regarding the manufacturer of the replaceable unit 200, information regarding the date and time of manufacture, serial number or model number), or repair service information.

The interface unit 250 connects the CPU 220 and the main controller 110. The interface unit 250 may be implemented as a serial interface or wireless interface. The serial interface reduce cost due to the use of fewer signals than a parallel interface, and is suitable for an operating condition where a large amount of noise occurs, such as a printer.

The components illustrated in the FIG. 2 are connected to each other via a bus, but this is merely an example. Accordingly, it is to be understood that the components according to aspects of the present general inventive concept may be connected directly without the bus.

Figure 3:
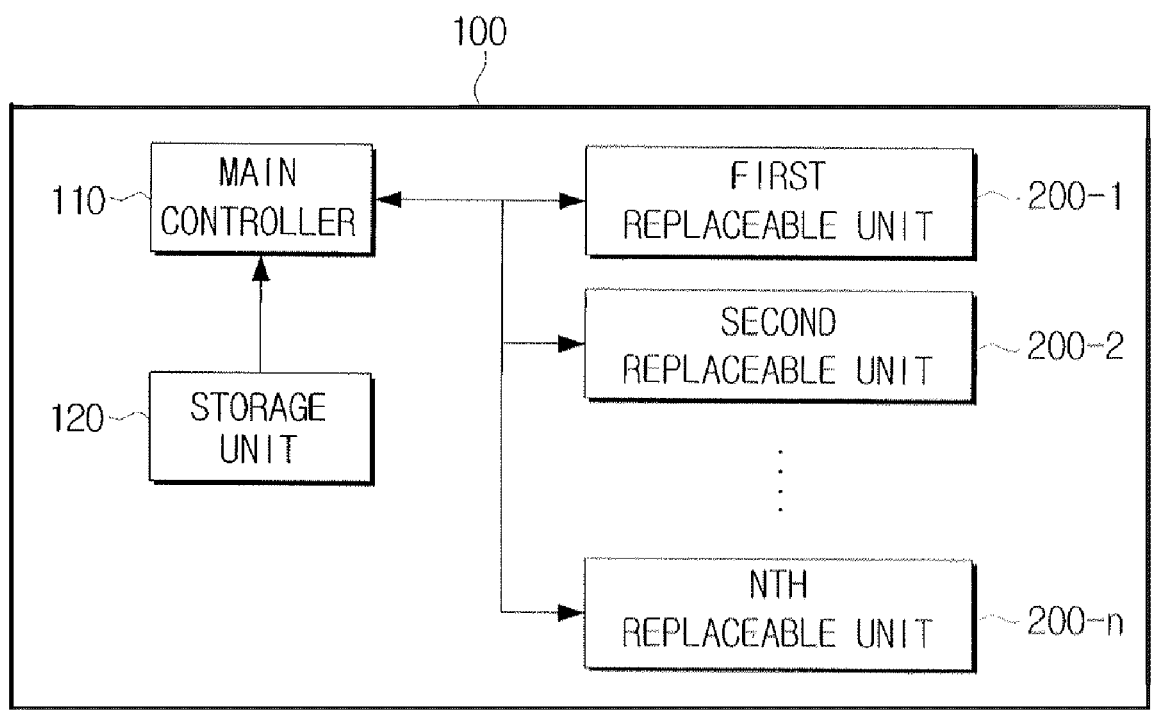
FIG. 3 is a schematic block diagram illustrating a configuration of an image forming apparatus according to an exemplary embodiment of the present general inventive concept.

FIG. 3 is a block diagram illustrating the image forming apparatus 100 according to the exemplary embodiment of the present general inventive concept. The image forming apparatus 100 of FIG. 3 includes the main controller 110, a storage unit 120 and a plurality of units 200-1, 200-2, ..., 200-n. The plurality of units 200-1, 200-2, ..., 200-n of FIG. 3 may be CRUM units, chips or replaceable units. It is hereinafter assumed that the plurality of units 200-1, 200-2, ..., 200-n are replaceable units.

If a single system requires various consumables, a plurality of units are also required. For example, if the image forming apparatus 100 is a color printer, four color cartridges, namely cyan (C), magenta (M), yellow (Y) and black (K) cartridges, are mounted in the color printer in order to express desired colors. Additionally, the color printer may include other consumables. Accordingly, if a large number of units are required, each of the units inefficiently requires respective input/output (I/O) channel thereof. Therefore, as illustrated in FIG. 3, a single serial I/O channel may be used to connect each of the plurality of units 200-1, 200-2, ..., 200-n to the main controller 110. The main controller 110 may access each of the plurality of units 200-1, 200-2, ..., 200-n using different addresses assigned to each of the plurality of units 200-1, 200-2, ..., 200-n.

When the main controller 110 is turned on or when the plurality of units 200-1, 200-2, ..., 200-n are mounted in the image forming apparatus 100, if each of the plurality of units 200-1, 200-2, ..., 200-n is completely initialized, authentication is performed using unique digital signature information for each of the plurality of units 200-1, 200-2, ..., 200-n.

If authentication is successful, the main controller 110 performs cryptographic data communication with a plurality of CPUs (not illustrated) in the plurality of units 200-1, 200-2, ..., 200-n, and stores information regarding the use history in a plurality of memory units (not illustrated) in the plurality of units 200-1, 200-2, ..., 200-n. The main controller 110 and plurality of CPUs may act as master and slave.

Here, the cryptographic data communication are performed by transmitting data, which a user desires to transmit, together with a MAC generated by encrypting the data using a preset cryptographic algorithm and key. Since the data varies every time the data is transmitted, the MAC may also change. Accordingly, even when a third party intervenes in the data communication operation and finds a MAC, hacking subsequent data communication operations using the MAC by a third party is impossible. Therefore, the security of data communication can be increased.

If the cryptographic data communication are completed, the channel connected between the main controller 110 and CPUs is cut.

The storage unit 120 stores a variety of information including key values and a plurality of cryptographic algorithms required for authentication of each of the plurality of units 200-1, 200-2, ..., 200-n.

The main controller 110 performs authentication and cryptographic data communication using the information stored in the storage unit 120. Specifically, the main controller 110 performs the authentication and the cryptographic data communication by applying an RSA asymmetric key algorithm and one of the ARIA, TDES, SEED, AES symmetric key algorithms, and so on. Therefore, both asymmetric and symmetric authentication processes are performed, thus increasing the cryptographic level, relative to the conventional art.

While FIG. 3 illustrates the storage unit 120 as a single unit, the storage unit 120 may include a storage unit to store a variety of cryptographic algorithm data, a storage unit required for other operations of the main controller 110, a storage unit to store information regarding the plurality of units 200-1, 200-2, ..., 200-n, or a storage unit to store information regarding the use of the plurality of units 200-1, 200-2, ..., 200-n (for example, sheets to be printed or remaining toner level).

The plurality of units 200-1, 200-2, ..., 200-n mounted in the image forming apparatus 100 of FIG. 3 may have the configuration illustrated in FIG. 1 or FIG. 2. Accordingly, after sending access commands to the plurality of CPUs of the plurality of units 200-1, 200-2, ..., 200-n and receiving acknowledge signals, the main controller 110 may access the plurality of units 200-1, 200-2, ..., 200-n. Therefore, the plurality of units according to the exemplary embodiment of the present general inventive concept differ from a conventional scheme capable of accessing CRUM data by simple data writing and reading operations.

If the image forming apparatus 100 starts an image forming job, the main controller 110 may measure the degrees of use of consumables used for the job, and may transmit the measured degrees to each of the plurality of units 200-1, 200-2, . . . , 200-n. In more detail, the image forming apparatus 100 may add the measured degrees to previously stored information on the use of consumables, may transmit a result value to the plurality of units 200-1, 200-2, . . . , 200-n, and may refresh the information on the use of consumables. If incorrect data is transmitted due to errors, incorrect information on the degree of use of consumables may be recorded on each of the plurality of units 200-1, 200-2, . . . , 200-n. For example, if a print job of 10 new sheets is completed after 1000 sheets are printed using a currently mounted developer cartridge, the total value is '1010'. However, if some errors occur and if a value of '0' is transmitted, a record of a print job of '0' sheet may be made on the plurality of units 200-1, 200-2, . . . , 200-n. As a result, accurately knowing the time at which the consumable needs to be replaced is impossible for a user.

To solve this problem, the main controller 110 may measure the degree of use of consumables used for the job, and may transmit only the measured degrees to each of the plurality of units 200-1, 200-2, . . . , 200-n. In the situation described above, the main controller 110 may transmit a value of '10', so the plurality of units 200-1, 200-2, . . . , 200-n may add the newly received value of '10' to a value of '1000', namely a previously stored value. Accordingly, the information on the use of consumables may be updated to be '1010'.

Otherwise, the main controller 110 may manage the information on the degree of use of consumables for itself by adding the measured amounts to the information on the use of consumables stored in the storage unit 120, separately from the plurality of units 200-1, 200-2, . . . , 200-n.

In this case, the main controller 110 may automatically update the information on the degree of use of consumables stored in the storage unit 120 while transmitting the information on the degree of use of consumables to the plurality of units 200-1, 200-2, . . . , 200-n every time the job is executed.

For example, when one hundred sheets are printed using the plurality of units 200-1, 200-2, . . . , 200-n mounted in the image forming apparatus 100, if 10 sheets are further printed while a single job is executed, the main controller 110 may send a value of '10' to the plurality of units 200-1, 200-2, . . . , 200-n, and may add the value of '10' to a value of '100' previously stored in the storage unit 120, so as to store history information indicating that '110' sheets were printed. Accordingly, if a specific event occurs (for example, if the image forming apparatus 100 is reset or if toner or ink is completely exhausted), or if a preset period comes, the main controller 110 and plurality of units 200-1, 200-2, . . . , 200-n may compare their respective history information, so checking whether data is normally recorded in each of the plurality of units 200-1, 200-2, . . . , 200-n is possible.

That is, accuracy or inaccuracy of the information on the use of consumables may be determined by comparing the information on the use of consumables stored in the storage unit 120 to the information on the use of consumables stored in the plurality of units 200-1, 200-2, . . . , 200-n. In more detail, if the events occur or if the preset period comes, the main controller 110 may transmit a command to request the information on the use of consumables to the plurality of units 200-1, 200-2, . . . , 200-n. In response to the request command, the CPUs of the plurality of units 200-1, 200-2, . . . , 200-n may transmit the information on the use of consumables stored therein to the main controller 110.

If the information on the use of consumables stored in the storage unit 120 differs from the information on the use of consumables stored in the plurality of units 200-1, 200-2, . . . , 200-n, the main controller 110 may output an error message, or may harmonize information determined to be correct and may update the information on the use of consumables.

Additionally, if the information on the use of consumables stored in the storage unit 120 differs from the information on the use of consumables stored in one of the plurality of units 200-1, 200-2, . . . , 200-n, the main control 110 may transmit a command to change the information on the use of consumables stored in the unit, because there is a possibility that errors could occur when data is transmitted to the unit.

Figure 4:
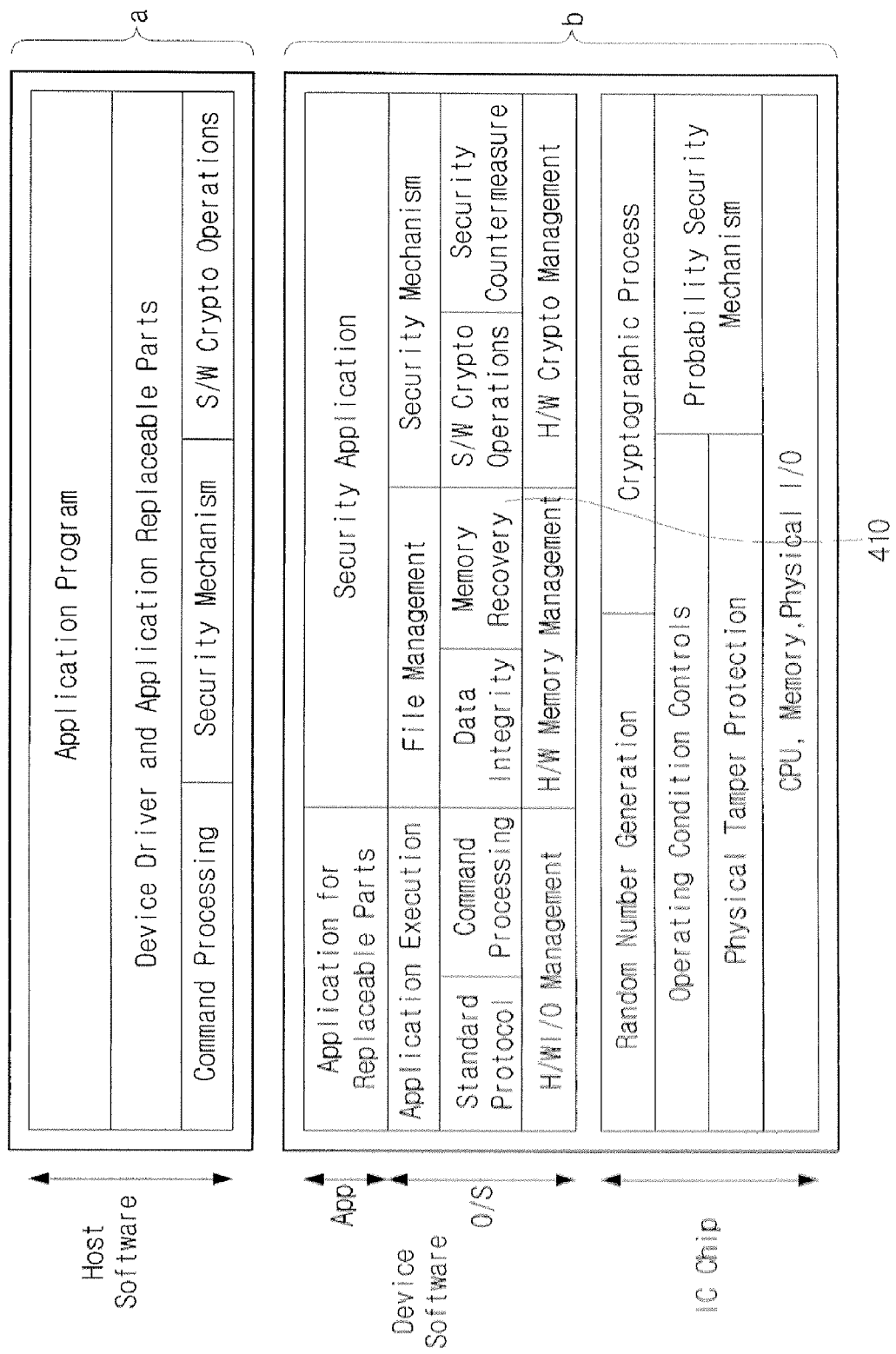
FIG. 4 is a schematic block diagram illustrating a configuration of software which is built into the image forming apparatus and the replaceable unit according to an exemplary embodiment of the present general inventive concept.

FIG. 4 is a hierarchy diagram illustrating a unit 200 and a host using the unit 200, that is, a configuration of software of an image forming apparatus according to an exemplary embodiment of the present general inventive concept.

Referring to FIGS. 1 and 4, software (a) of the image forming apparatus 100 may include a secure mechanism region to perform authentication and cryptography with the unit 200, and a software cryptographic operation region to perform software cryptography, in addition to general application programs, an application for managing data of each unit, a device driver which performs its own management, and program for processing commands.

Software (b) of the unit 200 may include an IC chip region having various blocks to secure data, an App region to interface with host software, and an OS region to operate the regions.

The Device Software region of FIG. 4 includes basic elements of an OS such as a file management and operating blocks required to secure data. Briefly, the blocks include a program to control hardware for a security system, an application program using the hardware control program, and a program to prevent tempering with other programs. As an application program to implement a function of CRUM is installed on the programs explained above, checking information stored on data through a communication channel is impossible. The programs may be embodied in other structures to include the basic blocks. However, to efficiently secure data, the programs are required to be programmed meticulously so that the OS is secured.

The OS region in the software structure of FIG. 4 includes a memory recovery region 410. The memory recovery region 410 is provided to guarantee whether the update is successfully achieved according to the process of updating the condition information of the unit 200.

When data is written on the memory unit 210, the CPU 220 of the unit 200 backs up previously recorded values within the memory recovery region 410, and sets a start flag.

For example, when the image forming job using the unit 200 is completed, the main controller 110 accesses the CPU 220 of the unit 200 so as to newly record condition information such as the amount of supplies or the number of sheets consumed when a print job is performed. If the power is cut off, or if the print job is terminated abnormally due to external noise before the recording is completed, the conventional CRUM may not be able to determine whether new condition information is normally recorded. If such abnormal conditions are repeated, it may be difficult to trust the information, and to manage the unit even using the CRUM.

To prevent this, the OS according to the exemplary embodiment of the present general inventive concept provides the memory recovery region 410 in the OS. In this case, the CPU backs up the previously recorded data in the memory recovery region 410 prior to recording data, and sets a start flag to 0. If a data writing operation is processed, the start flag is continuously updated according to the data writing operation.

In this state, if the data writing operation is terminated abnormally, the CPU checks the start flag after the power is turned on, or after a system is stabilized. The CPU thus determines whether the data are written normally according to the variation conditions of the start flag value. If the difference between the start flag value and the initially set value is not significant, the CPU determines that data writing has failed, and rolls back the data to the previously recorded values. Alternatively, if the start flag value coincides approximately with a final value, the CPU determines that the currently recorded data is correct. Therefore, even when the power is turned off, or when the system operates abnormally, the data written in the unit 200 may be trusted.

Figure 5:
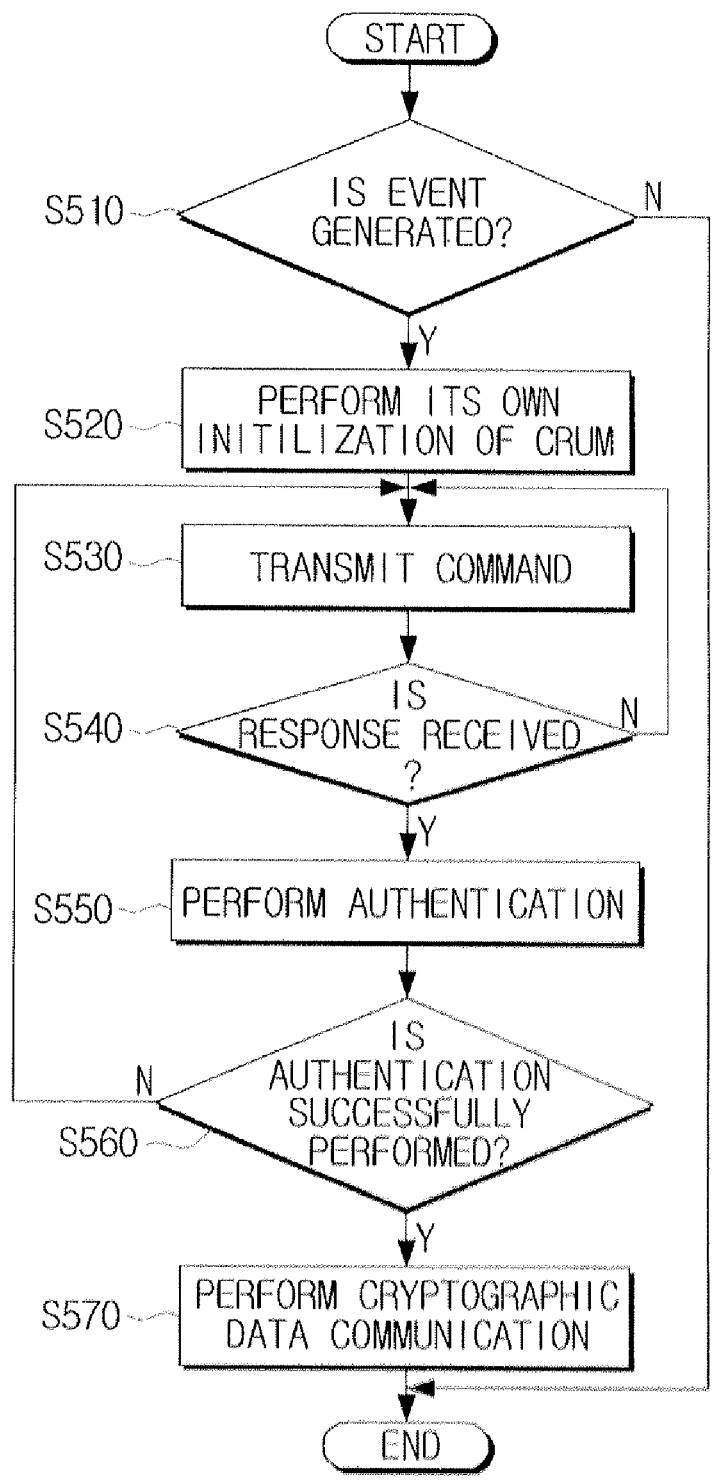
FIG. 5 is a flowchart illustrating a method to operate the replaceable unit and the image forming apparatus according to an exemplary embodiment of the present general inventive concept.

FIG. 5 is a flowchart illustrating a method to operate the replaceable unit and the image forming apparatus according to an exemplary embodiment of the present general inventive concept. Referring to FIGS. 1 and 5, the CPU of the unit 200 determines whether a specific event is generated in operation S510. The specific event may include a case in which the image forming apparatus 100 is powered on, or a case in which the unit 200 or components including the unit 200 are mounted in the image forming apparatus 100.

If a determination is made that a specific event occurs, the unit 200 performs its own initialization in operation S520. The initialization includes calculating secret information required for data communication with the image forming apparatus after initialization, setup of a communication channel, initialization of memory values, checking remaining amounts of toner or ink, confirmation of the replacement time, or various other processes.

The main controller 110 of the image forming apparatus 100 transmits a command to attempt authentication between the main controller 110 and the CPU 220 in operation S530. If the main controller 110 does not receive a response from the CPU 220 in operation S540, the main controller 110 repeatedly transmits the command until the response is received.

When the response is received, the main controller 110 authenticates communication with the CPU 220 in operation S550. The process of authenticating communication is explained above, so overlapping detailed description is omitted.

If the authentication is successfully performed in operation S560, cryptographic data communication with the main controller 110 is performed using a cryptographic algorithm in operation S570.

Figure 6:
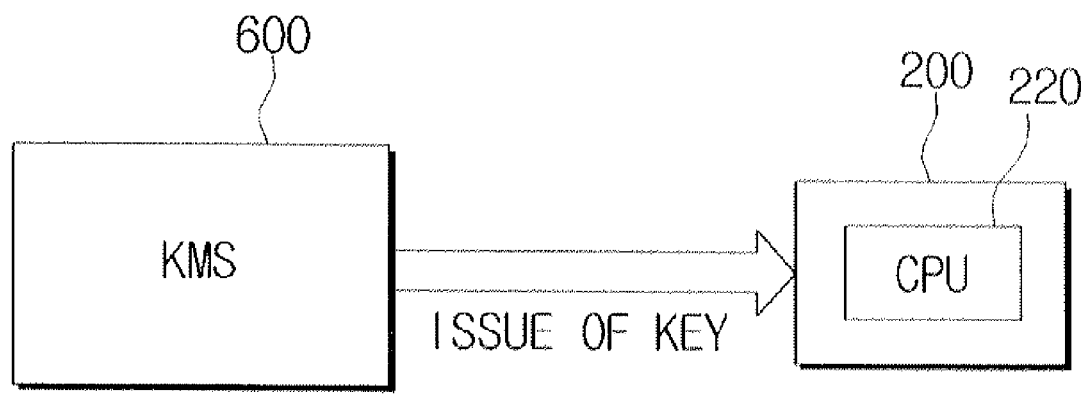
FIG. 6 is a flowchart illustrating a process of changing cryptographic algorithms by the replaceable unit according to an exemplary embodiment of the present general inventive concept.

FIG. 6 is a schematic view provided to explain a process of changing a cryptographic algorithm by the unit 200 according to an exemplary embodiment of the present general inventive concept. Referring to FIG. 6, the unit 200 may support ARIA, Triple Data Encryption Standard (TDES), SEED, and Advanced Encryption Standard (AES) symmetric key algorithms. Which algorithm to use may be determined when a key write system in a key management system (KMS) generates key generating data.

If a cracking is performed, a cryptographic algorithm may be changed by acquiring a new key from the KMS to which another of the four cryptographic algorithms is applied instead of manufacturing a new unit 200.

As described above, the image forming apparatus 100 may also support ARIA, TDES, SEED, and AES symmetric key algorithms in addition to an RSA asymmetric key algorithm. Accordingly, even if the cryptographic algorithm applied to the unit 200 is changed, the image forming apparatus 100 also changes a cryptographic algorithm to respond it, and performs the authentication and cryptographic data communication.

Therefore, the cryptographic algorithms may be changed conveniently by changing a key value in contrast to the conventional art, which requires a chip to be replaced.

FIG. 7 is a flowchart provided to explain a method to perform authentication and cryptographic data communication according to an exemplary embodiment of the present general inventive concept. Referring to FIGS. 1 and 7, the image forming apparatus 100 transmits a command to request authentication along with a random value R1 in operation S710.

If the request for authentication is received, the unit 200 generates a session key, using the received random value R1 and the random value R2 generated by the unit 200 in operation S715, and generates a message authentication code (MAC) using the generated session key in operation S720.

The generated MAC, a prestored electronic signature information, and the random value R2 are transmitted to the image forming apparatus 100 in operation S725.

The image forming apparatus 100 verifies electronic signature by comparing the received electronic signature information with a prestored electronic signature information in operation S730. To verify the electronic signature, the image forming apparatus 100 may store electronic signature information of each unit, if a plurality of units are mounted in the image forming apparatus 100.

If the electronic signature is verified, the image forming apparatus 100 generates a session key by combining the pre-generated random value R1 with the received random value R2 in operation S735, and generates a MAC using the generated session key in operation S740.

The image forming apparatus 100 compares the generated MAC with the received MAC in order to determine whether the MACs coincide in operation S745. The authentication is completed according to the verification of the MAC. If the authentication is successfully performed, the cryptographic data communication may be performed.

To perform cryptographic data communication, it is assumed that the image forming apparatus 100 uses the same key and cryptographic algorithm as the key and cryptographic algorithm of the unit 200. The key may be the session key described above.

If the MAC is completely verified, the image forming apparatus 100 generates a MAC by applying the key and cryptographic algorithm to data when generating a communication message in operation S750.

The image forming apparatus 100 transmits the communication message including the MAC to the unit 200 in operation S755.

The unit 200 extracts the data portion from the received communication message, and generates a MAC by applying the above key and cryptographic algorithm to the data in operation S760.

The unit 200 extracts MAC portion from the received communication message, and performs authentication by comparing the extracted MAC with the MAC calculated on the unit 200 in operation S765.

If the extracted MAC is consistent with the MAC calculated on the unit 200, the communication message is treated as a valid communication message, and thus the operation corresponding to the message is performed in operation S770. Alternatively, if the MACs are not consistent with each other, the communication message is treated as an invalid communication message, and is discarded.

A method to perform authentication and cryptographic data communication may also be applied to the exemplary embodiments explained with reference to the drawings. The unit 200 may be implemented in diverse forms such as a chip, a normal unit, or a replaceable unit.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although various embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus, comprising:
    a main body portion of the image forming apparatus; and
    at least one replaceable unit which is mountable to the main body portion of the image forming apparatus to execute an image forming operation,
    wherein the main body portion of the image forming apparatus comprises a main controller to control operations of the image forming apparatus,
    wherein the at least one replaceable unit comprises:
    a memory unit to store information regarding the replaceable unit and to store a program for performing an initialization; and
    a central processing unit (CPU) which is coupled to the memory unit, wherein, when the replaceable unit is mounted to the image forming apparatus, the CPU is initialized using the program stored in the memory unit of the replaceable unit, the CPU configured to access the information stored in the memory unit and to perform authentication and cryptographic data communication with the main controller of the image forming apparatus by executing a cryptographic algorithm selected from a plurality of cryptographic algorithms.

2. The image forming apparatus as claimed in claim 1, wherein the memory unit of the replaceable unit stores an operating system to be executed by the CPU and the program for performing initialization is included in the operating system, the operating system of the CPU is different from an operating system of the main controller.

3. The image forming apparatus as claimed in claim 1, wherein the main controller transmits an authentication request to the CPU of the at least one replaceable unit, and when a first message authentication code (MAC1) generated by the CPU are transmitted from the CPU to the main controller in response to the authentication request, the main controller verifies the MAC1 received from the CPU to perform the authentication of the at least one replaceable unit.

4. The image forming apparatus as claimed in claim 1, wherein, after the at least one replaceable unit has been authenticated, the main controller performs the cryptographic data communication with the at least one replaceable unit by generating a second message authentication code (MAC2), applying an encryption algorithm to data to be transmitted to the replacement unit, generating a communication message by combining the generated MAC2 and the encrypted data, and transmitting the communication message to the CPU of the replaceable unit.

5. The image forming apparatus as claimed in claim 4, wherein a value of the MAC2, included in the transmitted communication message to the CPU of the replaceable unit, is changed for each occurrence of communication with the CPU.

6. The image forming apparatus as claimed in claim 1, wherein the main controller performs the authentication or the cryptographic data communication with the at least one replaceable unit using unique digital signature information being set for each of the at least one replaceable unit.

7. The image forming apparatus as claimed in claim 1, wherein the main controller performs the authentication or the cryptographic data communication by applying a RSA asymmetric key algorithm and one of ARIA, TDES, SEED and AES symmetric key algorithms, and the CPU of the at least one replaceable unit performs the authentication or the cryptographic data communication by applying one of the ARIA, TDES, SEED, and AES symmetric key algorithms.

8. The image forming apparatus as claimed in claim 1, wherein the replaceable unit comprises:
    a crypto unit to allow the CPU to perform the authentication or the cryptographic data communication with the main controller of the image forming apparatus; and
    a tamper detector to respond to physical hacking attempts.

9. The image forming apparatus as claimed in claim 1, wherein the memory unit has a software structure including a memory recovery region, and the CPU backs up previously recorded values within the memory recovery region and sets a start flag when a data writing operation for the memory unit is executed.

10. The image forming apparatus as claimed in claim 9, wherein the CPU checks changed values of the start flag when a specific event happens, and then determines whether the changed values are rolled back to the previous recorded values.

11. The image forming apparatus as claimed in claim 1, wherein the main controller is connected to the at least one replaceable unit through one serial I/O channel, and is accessed to the at least one replaceable unit using individual addresses assigned to each replaceable unit.

12. The image forming apparatus as claimed in claim 1, wherein, when the image forming job is executed, the main controller measures values of degrees of use of consumables used for the image forming job, transmits the measured values to the CPU of the at least one replaceable unit, and the CPU adds the values to the information on the use of consumables pre-stored in each respective memory unit, and then updates the information on the use of consumables.

13. The image forming apparatus as claimed in claim 12, wherein the main body portion of the image forming apparatus further comprises a storage unit to store information on the use of consumables,
    wherein the main controller adds the measured values of degrees of use of consumables to information on the use of consumables pre-stored in the storage unit, and manages the information on the use of consumables separately from the at least one replaceable unit.

14. The image forming apparatus as claimed in claim 13, wherein the main controller compares the information on the use of consumables stored in the storage unit with the information on the use of consumables stored in the replaceable unit, and checks the accuracy of the information on the use of consumables.

15. The image forming apparatus as claimed in claim 1, wherein the memory unit of the replaceable unit stores a program for performing the authentication and the cryptographic data communication with the main controller, the program for performing the authentication and the cryptographic data communication is executed after the initialization of the CPU.

16. The image forming apparatus as claimed in claim 1, wherein the memory unit and the CPU provided in the replaceable unit are integrated in a single customer replaceable unit monitoring memory (CRUM) unit chip.

17. A customer replaceable unit monitoring (CRUM) unit for a replaceable unit, the replaceable unit which is removably mountable to an image forming apparatus, the image forming apparatus having a main controller, the CRUM unit comprising:
   a memory unit to store information regarding the replaceable unit and to store a program for performing an initialization; and
   a central processing unit (CPU) which is coupled to the memory unit, wherein, when the replaceable unit is mounted to the image forming apparatus, the CPU is initialized using the program stored in the memory unit of the replaceable unit, the CPU configured to access the information stored in the memory unit and to perform authentication and cryptographic data communication with the main controller of the image forming apparatus by executing a cryptographic algorithm selected from a plurality of cryptographic algorithms.

18. The CRUM unit as claimed in claim 17, wherein the memory unit stores a first program for managing the information stored in the memory unit and a second program for performing the authentication and the cryptographic data communication with the main controller of the image forming apparatus.

19. The CRUM unit as claimed in claim 17, wherein the memory unit stores an operating system to be executed by the CPU, and the program for performing the initialization is included in the operating system, the operating system of the CPU is different from an operating system executed by the main controller.

20. The CRUM unit as claimed in claim 17, wherein the CPU performs the cryptographic data communication after the authentication with the main controller of the image forming apparatus is completed.

21. The CRUM unit as claimed in claim 17, wherein when an authentication request is received from the main controller, the CPU generates a first message authentication code (MAC1) and transmits the generated MAC1 to the main controller.

22. The CRUM unit as claimed in claim 17, wherein the CPU performs the cryptographic data communication such that when a communication message including data and a second message authentication code (MAC2) is transmitted from the main controller of the image forming apparatus, a third message authentication code (MAC3) is generated by the CPU by applying a key, and if the generated MAC3 matches with the MAC2 included in the transmitted communication message, the transmitted communication message is treated as a valid communication message and processed.

23. The CRUM unit as claimed in claim 17, wherein when the image forming apparatus is powered on and when the replaceable unit with the CRUM unit is mounted on the image forming apparatus, the CPU performs the initialization, and does not respond to a command from the main controller before the initialization is completed.

24. The CRUM unit as claimed in claim 17, wherein the memory unit includes at least one of an OS memory, a non-volatile memory to store data in non-volatile form, and a volatile memory to be used as a temporary storage space required for operations.

25. The CRUM unit as claimed in claim 17, further comprising:
   an interface unit to connect the main controller to the CPU;
   a tamper detector to respond to physical hacking attempts; and
   a crypto unit to allow the CPU to perform the authentication or the cryptographic data communication with the main controller.

26. The CRUM unit as claimed in claim 17, wherein the memory unit has a software structure including a memory recovery region, and the CPU backs up previous recorded values within the memory recovery region and sets a start flag when a data writing operation for the memory unit is executed.

27. The CRUM unit as claimed in claim 26, wherein the CPU checks changed values of the start flag when a specific event happens, and then determines whether the changed values are rolled back to the previous recorded values.

28. The CRUM unit as claimed in claim 17, wherein the CPU receives values of degrees of use of consumables used for the image forming job when the image forming job is executed, from the main controller, and the CPU adds the values to information on the use of consumables stored in the memory unit, and then refreshes the information on the use of consumables.

29. A replaceable unit which is removably mountable to an image forming apparatus, the image forming apparatus having a main controller, the replaceable unit comprising:
   a memory unit to store information regarding the replaceable unit and to store a program for performing an initialization; and
   a central processing unit (CPU) which is coupled to the memory unit, wherein, when the replaceable unit is mounted to the image forming apparatus, the CPU is initialized using the program stored in the memory unit of the replaceable unit, the CPU configured to access the information stored in the memory unit and to perform authentication and cryptographic data communication with the main controller of the image forming apparatus by executing a cryptographic algorithm selected from a plurality of cryptographic algorithms.

30. The replaceable unit as claimed in claim 29, wherein the memory unit stores a first program for managing the information stored in the memory unit and a second program for performing the authentication and the cryptographic data communication with the main controller of the image forming apparatus.

31. The replaceable unit as claimed in claim 29, wherein the memory unit stores an operating system to be executed by the CPU, and the program is included in the operating system, the operating system of the CPU is different from an operating system executed by the main controller.

32. The replaceable unit as claimed in claim 29, wherein the CPU performs the cryptographic data communication after the authentication with the main controller of the image forming apparatus is completed.

33. The replaceable unit as claimed in claim 29, wherein, when an authentication request is received from the main body portion of the image forming apparatus, the CPU generates a first message authentication code (MAC1) and transmits the generated MAC1 to the main body portion of the image forming apparatus.

34. The replaceable unit as claimed in claim 29, wherein the CPU performs the cryptographic data communication such that when a communication message including data and a second message authentication code (MAC2) is transmitted from the main controller of the image forming apparatus, a third message authentication code (MAC3) is generated by the CPU by applying a key, and if the generated MAC3 matches with the MAC2 included in the transmitted communication message, the transmitted communication message is treated as a valid communication message and processed.

35. The replaceable unit as claimed in claim 29, wherein when the image forming apparatus is powered on and when the replaceable unit is mounted on the image forming apparatus, the CPU performs the initialization, and does not respond to a command from the main controller of the image forming apparatus before the initialization is completed.

36. The replaceable unit as claimed in claim 29, wherein the memory unit includes at least one of an OS memory, a non-volatile memory to store data in non-volatile form, and a volatile memory to be used as a temporary storage space required for operations.

37. The replaceable unit as claimed in claim 29, further comprising:
an interface unit to connect the main controller to the CPU;
a tamper detector to respond to physical hacking attempts; and
a crypto unit to allow the CPU to perform the authentication or the cryptographic data communication with the main controller.

38. The replaceable unit as claimed in claim 29, wherein the memory unit has a software structure including a memory recovery region, and the CPU backs up previous recorded values within the memory recovery region and sets a start flag when a data writing operation for the memory unit is executed, and the CPU further checks changed values of the start flag when a specific event happens and then determines whether the changed values are rolled back to the previous recorded values.

39. The replaceable unit as claimed in claim 29, wherein the CPU receives values of degrees of use of consumables used when the image forming job is executed using the replaceable unit, from the main body portion of the image forming apparatus, and the CPU adds the values to the information on the use of consumables stored in the memory unit, and then refreshes the information on the use of consumables.

40. A method for performing authentication and cryptographic data communication with a customer replaceable unit monitoring (CRUM) unit, the method comprising:
transmitting an authentication request to the CRUM unit having a CPU and a memory unit storing a program for performing an initialization of the CPU and generating a first message authentication code (MAC1);
receiving the first message authentication code (MAC1) from the CRUM unit in response to the authentication request;
performing authentication based on the MAC1 received from the CRUM unit; and
if the authentication is completed, performing cryptographic data communication with the CRUM unit,
wherein the authentication and cryptographic data communication with the main controller of the image forming apparatus is performed by executing a cryptographic algorithm selected from a plurality of cryptographic algorithms.

41. The method as claimed in claim 40, wherein the transmitting an authentication request comprises generating a first random number and transmitting the first random number along with the authentication request;
wherein, when receiving the MAC1 from the CRUM unit, a second random number is received along with the MAC1.

42. The method as claimed in claim 41, wherein the authentication and the cryptographic data communication are performed by applying a RSA asymmetric key algorithm or one of ARIA, TDES, SEED and AES symmetric key algorithm.

43. The method as claimed in claim 41, wherein the performing authentication comprises:
generating a session key using the first random number and the second random number;
generating a second message authentication code (MAC2) using the session key; and
verifying the MAC1 received from the CPU by comparing the generated MAC2 with the received MAC1.

44. The method as claimed in claim 43, wherein the performing cryptographic data communication comprises:
generating a third message authentication code (MAC3);
generating a communication message including the generated MAC3 and a communication data; and
transmitting the communication message to the CRUM unit.

45. An apparatus for performing authentication and cryptographic data communication with a customer replaceable unit monitoring (CRUM) unit, the CRUM unit having a CPU and a memory unit storing a program for performing an initialization of the CPU and generating a first message authentication code (MAC1), the apparatus comprising:
a controller which generates an authentication request to be transmitted to the CRUM unit; and
an interface which transmits the authentication request generated by the controller to the CRUM unit,
wherein the controller performs authentication based on the first message authentication code (MAC1) received from the CRUM unit in response to the authentication request, and performs cryptographic data communication with the CRUM unit if the authentication is completed,
the authentication and cryptographic data communication with the main controller of the image forming apparatus is performed by executing a cryptographic algorithm selected from a plurality of cryptographic algorithms.

46. The apparatus as claimed in claim 45, wherein the controller is configured to generate a first random number that is to be transmitted along with the authentication request.

47. The apparatus as claimed in claim 45, wherein the authentication and the cryptographic data communication are performed by the controller by applying a RSA asymmetric key algorithm or one of ARIA, TDES, SEED and AES symmetric key algorithm.

48. The apparatus as claimed in claim 47, wherein the controller performs authentication by generating a session key using the first random number and a second random number received from the CRUM unit, generating a second message authentication code (MAC2) using the session key, and verifying the MAC1 received from the CRUM unit by comparing the generated MAC2 with the received MAC1.

49. The apparatus as claimed in claim 48, wherein the controller performs cryptographic data communication by generating a third message authentication code (MAC3), generating a communication message including the generated MAC3 and communication data, and transmitting the communication message to the CRUM unit.

* * * * *